United States Patent Office 2,757,092
Patented July 31, 1956

2,757,092

PROCESS FOR MAKING ICE CREAM MIXES

Albert P. Zepp, Fountain City, Charles J. Zepp, Alma, and Francis P. Zepp, Fountain City, Wis.

No Drawing. Application March 20, 1952,
Serial No. 277,728

5 Claims. (Cl. 99—55)

This invention relates to the manufacturing of dry mixes for the manufacture of ice cream, frozen desserts and baked goods and more particularly to the manufacturing of such mixes from buttermilk, and it has for its object to improve the above mentioned process in such a manner that a uniform product free of objectionable properties and of improved texture and keeping quality results.

In the manufacturing of ice cream it has been repeatedly suggested to use buttermilk when preparing ice cream mixes as buttermilk is a relatively inexpensive product. This suggestion has been usually made without in any way realizing the seriousness of the obstacles accompanying the commercial utilization of the suggestion. The use of buttermilk has manifestly the advantage that the fat content of the buttermilk can be utilized. While in itself buttermilk has necessarily a low fat content, as it is a by-product of a process intending to separate the butter fat, its fat content is not negligible, as the process of churning milk or cream does not remove the fat completely. Further, the content of milk solids is not materially reduced during the churning process so that the use of buttermilk still has the advantage of furnishing a nourishing dish in which however—in accordance with the wishes of a majority of the consumers— the nourishing substances, such as protein and carbohydrates, or the vitamins are not mainly or exclusively formed or carried by fats.

However, attempts to apply this suggestion practically soon revealed the serious obstacles and difficulties which are connected with this suggestion. Ice cream is quite specially a product which is marketed for its clean and delicate flavor and any marked change in flavor or palatability makes such a product unmarketable.

Extensive laboratory tests showed that the use of buttermilk as a source of milk-solids-non-fat produces a very marked deterioration of the flavor. It introduces a strong salty flavor, and also gives rise to objectionable odors. Moreover, the exclusive use of buttermilk solids in ice cream mixes was found to produce an unusually wide variation with respect to those qualities which are essential in ice cream, such as flavor, odor, keeping quality and emulsifying or whipping action, the variations being such that the quantity production of a marketable product was not possible.

It has been more specifically proposed to use buttermilk made from sweet cream with an extremely high fat content, and it was asserted that the product thus obtained had no objectionable qualities. The extremely high fat content of the cream, however, is in itself a serious limitation of the use of buttermilk and has certain specific disadvantages explained below and while it seems that a high fat content of the cream removes some of the objectionable features it will be clear that it also eliminates many of the most essential advantages of the use of buttermilk.

It is therefore the main object of the present invention to provide a process which allows the use of sweet cream buttermilk obtained by churning cream of any fat content, for the production of ice cream mixes and mixes for desserts or for improving the dough of baked goods, which permits to eliminate the above enumerated objectionable features and especially the objectionable flavor, odor and emulsifying properties imparted to the product by the buttermilk.

A further object of the invention consists in improving simultaneously the process of making ice cream mixes or mixes for frozen desserts and for the improvement of the dough of baked goods in such a manner that not only the whipping qualities and the emulsifying action, when compared with products of comparable fat contents, is markedly improved, but better keeping qualities for the ice cream and for frozen desserts are produced.

It is a further object of the invention to improve the process above described by eliminating the non-uniformity of the product, especially with respect to the whipping or emulsifying action and with respect to odors and to flavor, so that the process may be used for current and continuous production of a uniform ice cream or frozen dessert.

It is a further object of the invention to so improve the process that a uniform and good body texture of the ice cream or frozen dessert is obtained and that especially the excessive sandiness due to the formation of large ice crystals during storage in a refrigerated condition is greatly retarded and practically eliminated.

It is a further object of the invention to produce a dry mix which is usable in connection with baked goods and which when added to the dough of pastry or cake improves the texture and the baking qualities and also contributes to the maintaining of the keeping qualities of the baked goods and to the preservation of the moisture content for a longer period of time.

Further and more specific objects which relate to specific features of the process or mix will be apparent from the following more detailed specification.

In order to better understand the invention it may first be explained that, by way of experiments, it was found that a marked difference can be noticed between the use of freshly churned buttermilk and the use of condensed buttermilk in connection with the making of ice cream mixes. It was found that the use of condensed buttermilk produced sometimes a very marked improvement, especially if the solid contents of the condensed buttermilk were raised to about 30%. Buttermilk such as produced by churning (hereinafter called "straight" buttermilk) has not a sufficient solids contents to be effective. Condensed buttermilk however improves very markedly the whipping qualities and the emulsification capability and therefore the texture of the ice cream. Likewise condensed buttermilk improves the keeping quality in many respects. However, the use of condensed buttermilk by itself removes in no way the above described objectionable qualities and more specifically the objectionable flavor and odor and the extreme variability of the product with respect to emulsification and whipping action, qualities which must be considered as essential. It was found that the product produced by the use of condensed buttermilk was very variable and perhaps even more variable than that produced by straight buttermilk and that when ice cream mix batches were made from condensed buttermilk some of them showed a very high quality with respect to texture and body while others made in the same way were extremely poor in this respect.

A systematic extensive research to determine the factors producing the variability and the objectionable features finally led to the conclusion that the combined action of a number of variable factors, partly inherent in the buttermilk used and partly connected with the preparatory treatment of the condensed buttermilk were responsible for the variations as well as for the other objectionable features.

Essentially therefore the invention consists in a process of preparing the buttermilk before and while condensing it, this preparation being carried out with a view to influencing the factors in question in such a way that a product of high uniform quality with excellent and standardized flavor, odor, fat content and emulsifying action results.

In order to better understand the process of preparing the condensed buttermilk for the above explained purpose those factors which must be influenced may first be discussed.

It was found that straight unprocessed buttermilk improved whipping and emulsification, but the content in solids is not sufficiently high to produce a result of any particular significance. Condensed buttermilk has a higher content in solids, which would permit a more decisive improvement but has two serious drawbacks. The heat treatment when compared with straight buttermilk is increased, an objectionable cooked flavor appears in the product and an objectionable buttermilk flavor is clearly noticeable in the finished ice cream.

It was further found that the objectionable buttermilk flavor could be overcome by the addition of skim milk but this addition again reduced the effectiveness of the buttermilk in improving the ice cream.

The obstacles to be overcome are therefore of two different types, and relate to the condensing process on one hand, and to the preparation of a suitable, mainly buttermilk containing starting product on the other hand.

This product to be commercially usable must have, as has been found by experiment, a standardized fat and lecithin content to be effective. This standardization must be carried out in such a manner that the fat and lecithin content is the same as that for a pure concentrated buttermilk.

This standardization process is difficult to carry out because the lecithin content of whole milk varies with the total fat content and therefore the factors causing a change in the fat content of the milk also change the lecithin content. The variations of the lecithin content therefore depend among others on all those factors influencing the fat content of the milk, such as the breed of cattle producing the milk, the lactation period of the cow, the season of the year, the physiological condition of the animal, and sudden changes in the animal's environment.

It has also been found that the improving influence of the buttermilk is largely due to the fact that the dairy processes tend to deposit the largest amount of lecithin with the buttermilk. Straight (unprocessed) buttermilk is therefore better than no buttermilk for making dried ice cream mixes and concentrated buttermilk is better than unprocessed straight buttermilk. Dried buttermilk, having the highest specific lecithin content is therefore best for obtaining a product of certain good qualities. However, the concentration also produces relatively large variations in the lecithin content as the difference between two samples, for instance, of unprocessed buttermilk is increased by the concentration factor after condensation and drying.

Further attention must therefore be paid to the fact that the addition of skim milk to improve the flavor must be compensated for, as this addition reduces the specific lecithin content (pro unit of weight or volume), the skim milk having no fat content. Therefore the process of standardization must be based on the skim milk content necessary for eliminating the objectionable flavors and as the lecithin content is dependent on the fat content, a suitable quantity of whole milk must be added to raise the fat content to a standard value, whereupon lecithin preferably in the form of dried egg yolk is added in order to obtain the desired standardized lecithin content.

Many tests have shown that with such a standardization process the fat content of a buttermilk skim milk mixture, containing skim milk to such an amount that the objectionable flavors disappear, is best first standardized by the addition of whole milk or cream, and thereafter the lecithin content of this mixture is standardized by the addition of egg yolk. This produces the desired combination of excellent flavor, elimination of objectionable odors and the desired consistency and uniformity in the texture and in the emulsification and whipping capabilities, provided that condensing of the buttermilk was carried out as explained below.

The second group of factors which influences the flavor and odor is not inherent in the milk but is connected with the temperature to which the buttermilk is exposed during preheating before condensing and is further connected with the time during which the buttermilk is exposed to the high temperature. It has been found that an extremely accurate temperature control is indispensable, that it is necessary to hold the temperature, when preheating the mixture before condensing, at a value not exceeding 163° F. and that the period during which the buttermilk is exposed should not exceed a few seconds, the limit being lower than 30 seconds.

A further factor influencing the presence of the above named objectionable properties of the product relates to the milk solids non-fat contents of the buttermilk. The control of the milk solids content during the condensing operation is not very exact with the usual condensation processes. In order to improve this control according to this invention, spray drying of the condensed mixture was introduced. This led to a dried product which was much improved over the usual condensed buttermilk product. If the process was so conducted that all factors which have been above mentioned were kept at their standard values, a product resulted which was always uniform in solids, fat, moisture and lecithin and which showed a uniform emulsifying or whipping ability, while the dried product could be stored without refrigeration for extended periods.

The simultaneous control of all the above named factors is essential for the success. The factors of both groups have a very decided influence on flavor and odor. This is clearly proved by an experimental omission of the temperature control. Without the temperature control the regulation of the other factors remains to a large part ineffective when considered from the standpoint of a uniform product conforming in its entirety to uniform standards. This means that while it is not impossible to obtain occasionally a good product without temperature control, it was not possible to obtain it regularly and uniformly. On the other hand temperature control alone or associated with a single one of the other factors did not eliminate the objectionable features which are due to the use of buttermilk. The invention therefore clearly consists in a process which influences all the aforementioned factors to a predetermined extent.

The dry product thus obtained was an absolutely uniform one and gave uniform results, whether it was used in the manufacture of ice cream, of iced milk or of frozen desserts or was used as a mix to be added to the dough of pastries or cakes. Not only an improved body texture and improved keeping qualities were obtained which were equal to those of high quality products, but also the whipping qualities and the emulsification had been so improved that the necessity of adding chemicals as emulsifying agents, or the further addition of egg yolk, or the like was eliminated. Also the clean and delicate flavor corresponds to that of other high quality products. The objectionable taste and odor had completely disappeared. That all offensive flavors and odors disappeared could be detected by the fact that by the use of pure vanilla perfect delicate flavor results were obtained and that it was unnecessary to use other strong flavoring in order to cover up traces of objectionable flavor, as in frozen products containing buttermilk solids.

The general outline of the manufacturing process is the following. The buttermilk as it comes from churning is held in a large processing tank and is tested for fat and lecithin content. When the test has been completed the correct amount of dried egg yolk, of skim milk, of whole milk and/or cream are calculated and are added in the processing tank in order that the buttermilk may reach the desired standard or minimum content. The mixture is then pumped through a preheater and heated to a temperature of 163° and it is held at this temperature for 20 seconds, as it enters the evaporator. In the evaporator it is condensed so that a milk solids content of from 35% to 45% of solids results. The condensed mixture is then pumped under pressure into a spray drier. The mixture enters the spray drier at a pressure of 3000 to 3500 lbs. It is atomized and sprayed into a chamber with filtered and heated air. A high temperature may be maintained in the chamber. It is preferable to drive or draw the air through the chamber by means of fans. When the milk solids of the mixture dry they drop to the bottom of the chamber while the moisture is carried off with the air which passes out of the chamber. The resulting product contains about 5% of fat, 91 to 92% of milk solids and 3 to 4% of moisture. To this product a sweetening agent and if desired a very small percentage of a stabilizer may be added.

*Example*

Let it be assumed that the standardized lecithin content of the complete mixture should be 0.14% and that the fat content of the dried mixture should be 5% which corresponds to a fat content of the liquid mixture of .45%. 700 lbs. of buttermilk are used for the run. By means of trial runs it has been previously ascertained that around 200 lbs. of skim milk are necessary to produce a product of good flavor and without objectionable quality. Assuming that the liquid buttermilk has 0.5% fat content, while skim milk has practically no fat content it is necessary to add whole milk having for example a fat content of 3.5% to produce the necessary and standardized fat content of the liquid of .45% on account of the skim milk addition which lowers the fat content of the mixture. A calculation shows that around 16 lbs. of whole milk are necessary for producing the desired fat content. The 16 lbs. have to be deducted from the skim milk so that 185 lbs. of skim milk and 16 lbs. of whole milk are added to the buttermilk.

Assuming further that the lecithin content of the liquid buttermilk is .13%, it will be clear that the addition of skim milk and whole milk produces a decrease of the percentage in the mixture. By calculating the difference between the actual content of lecithin provided by the buttermilk and the standardized content which the mixture should have, it is found that 2.46 lbs. of dried egg yolk having a lecithin content of 15% must be added in order to bring the lecithin content of the liquid mixture to a standard value of .14% of lecithin.

The mixture is therefore prepared from the following ingredients:

| | Fat Content | Lecithin Content |
|---|---|---|
| 700 lbs. of buttermilk | .5% | .13% |
| 185 lbs. of skim milk | negligible | negligible. |
| 16 lbs. of whole milk | 3.5% | Do. |
| 2.46 lbs. of egg yolk | negligible | 15%. |

This mixture is then condensed and spray dried as above described and the resulting product is packaged.

From the above it will be seen that the main ingredient of the dry mix according to the invention is buttermilk, the skim milk and the whole milk which are added in relatively varying proportions are relatively small in proportion and serve to standardize the minimum butter fat content. Likewise the egg yolk is only added to such an extent that the lecithin content of the mix is standardized, this addition being also in varying amounts depending on conditions. An accurate temperature control is exercised, as has been described, during the preheating process.

The dried buttermilk product may also be used in cakes, pastries and bread as an addition to the dough which improves the latter and thereby the quality of the baked goods. The main advantage derived from the addition is the retention of moisture in the baked goods, the period of retention being extended quite markedly. Also an improvement in texture and in baking properties was found.

Also in connection with this use for the improvement of the dough of baked goods the absolute uniformity which was obtained was of a great advantage.

It will therefore be seen that the mix prepared in accordance with the present invention permits to dispose of all the objectionable features which are inherent in buttermilk when used straight and without control analysis, standardization and regulative pretreatment. More specifically the non-uniformity of the resultant product disappears completely and the whipping and the emulsifying action become standardized throughout the batch which now has a uniform lecithin and fat content. Likewise the differences in the solids content are eliminated through the condensing and drying process so that also the solids and moisture content is always throughout the same.

In the finished frozen product the strong salty flavor and the offensive odor are eliminated by the additions and by the temperature control. The good body texture is partly due to the use of condensed buttermilk, but no use could be made of such condensed buttermilk unless the other objectionable features especially the bad odor and flavor have also been eliminated. The poor texture especially the excessive sandiness and the formation of large ice crystals during storage disappear when according to the invention condensed buttermilk instead of straight buttermilk is used. The main point is that every batch of the mixture is uniform and also every batch has the same body texture and perfection.

It may be added that the dried mixture can be stored for extended periods as it is a dry product and no refrigeration is necessary in order to keep it. That the flavor is of a high quality is best proved by the above mentioned fact that vanilla can be used in the pure state and that it is not necessary to add a strong extra flavor in order to cover up any objectionable flavors as is the case when other forms of buttermilk are used.

It will thus be seen that by means of the present invention it is possible to use any sweet cream buttermilk without limitation with respect to the source from which it is derived or with respect to the specific qualities which it must have and not merely buttermilk made from cream of a definite high fat content, for making an ice cream.

It will also be understood that unessential changes may be made in the process without in any way departing from the essence of the invention defined in the annexed claims.

Having described the invention, what is claimed as new is:

1. A process for making food mix preparations free of buttermilk flavor and odor from buttermilk, consisting in storing the buttermilk, in standardizing the fat and lecithin content of the stored buttermilk by first determining the fat and lecithin content of the stored milk and thereafter adding egg yolk and fat containing milk components until a predetermined standard value of fat and lecithin are obtained, in preparing from the buttermilk thus pretreated condensed buttermilk by heating and evaporating, using a controlled temperature which never exceeds 163° F., and in drying the condensed product, the predetermined standardized value of fat and lecithin being determined relatively to the condensed buttermilk, the fat content being 5% and the lecithin content being 1.28% of the buttermilk in its condensed state.

2. A process as claimed in claim 1 wherein the milk solids content of the buttermilk is increased until the milk solids content, after evaporation, is around 35% to 45% the milk solids in the resulting product after spray drying being approximately 90 to 97%.

3. A process for making ice cream mixes from buttermilk under elimination of the objectionable flavor and odor of buttermilk, consisting in storing the buttermilk in containers, in standardizing the fat and lecithin content of the stored buttermilk by adding skim milk and whole milk to such an extent that a fat content of approximately 5% is obtained in the buttermilk after condensation and by adding lecithin containing products to such an extent that the lecithin content of 1.28% is obtained in the buttermilk after condensation, in condensing the buttermilk by preheating using a temperature not exceeding 160° F., and in spray drying after preheating to produce a condensed buttermilk product with a solids content of approximately 90 to 97%.

4. A process for making ice cream mixes from buttermilk as claimed in claim 3 in which the quantity of skim milk added is first determined on the basis of its capability to eliminate objectionable buttermilk flavors, that the quantity of whole milk to be added is thereupon determined on the basis of bringing the total quantity of buttermilk with added skim milk to the predetermined fat content of 5% after condensation, and that the quantity of the actual addition of skim milk and whole milk made to the buttermilk, is equal to the quantity of skim milk as above determined on the basis of its function, by the amount of whole milk which is added along with the skim milk.

5. A process for making ice cream mixes as claimed in claim 3 wherein the buttermilk during the preheating stage is heated to a temperature near but not exceeding 163° F. only during a time not exceeding 30 seconds.

References Cited in the file of this patent

UNITED STATES PATENTS

| | | |
|---|---|---|
| 846,697 | Sauer | Mar. 12, 1907 |
| 1,230,452 | Wiley | June 19, 1917 |
| 1,374,138 | Coulson | Apr. 5, 1921 |
| 2,671,729 | Fear et al. | Mar. 9, 1954 |